May 22, 1928.
A. PFAU
1,671,047
POWER INSTALLATION
Filed April 1, 1922
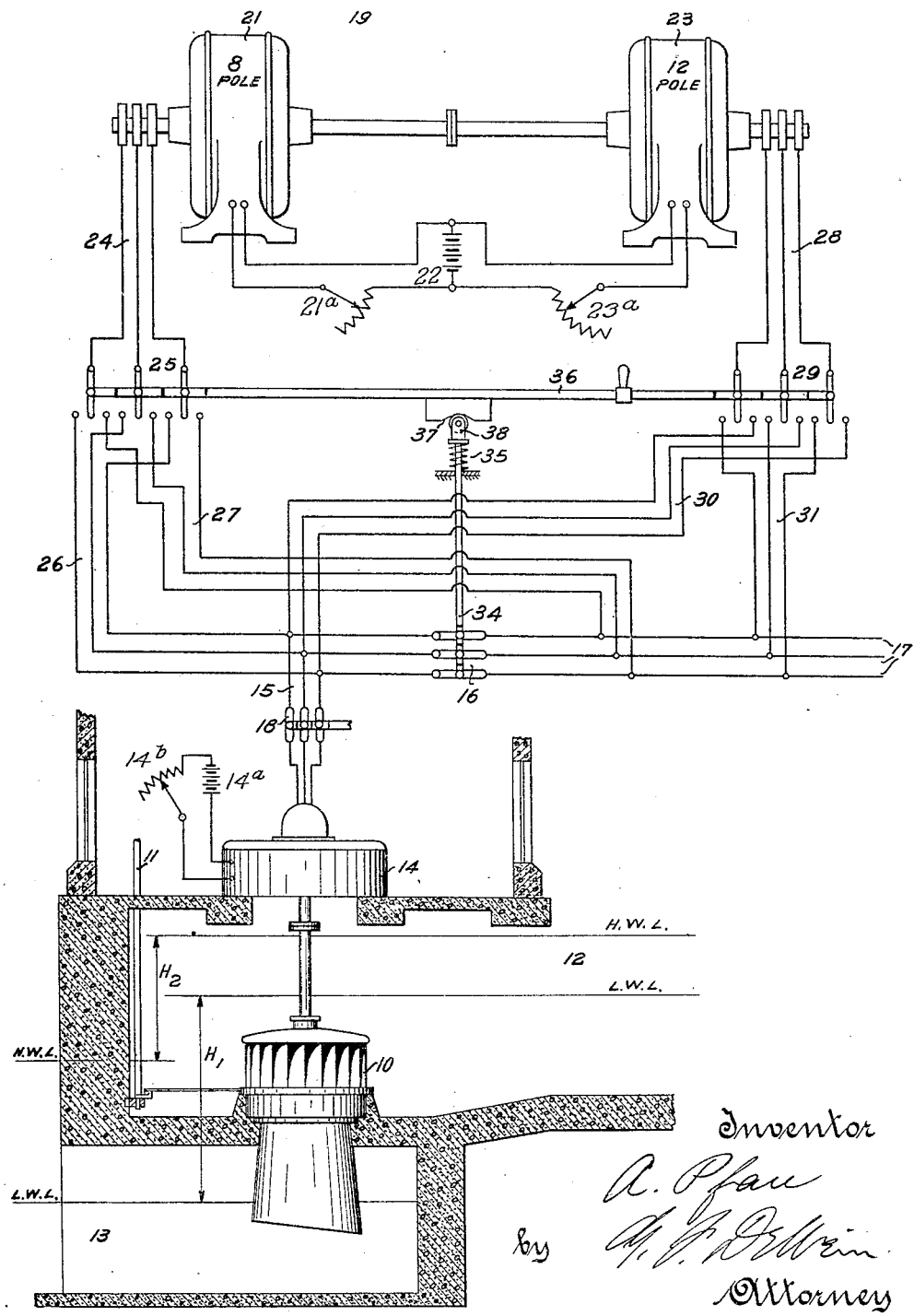

Patented May 22, 1928.

1,671,047

UNITED STATES PATENT OFFICE.

ARNOLD PFAU, OF MILWAUKEE, WISCONSIN, ASSIGNOR TO ALLIS-CHALMERS MANUFACTURING COMPANY, OF MILWAUKEE, WISCONSIN, A CORPORATION OF DELAWARE.

POWER INSTALLATION.

Application filed April 1, 1922. Serial No. 548,628.

This invention relates in general to power installations and it has particular relation to hydro-electric power installations where the hydraulic machine is operative under or against a widely varying head.

It is well known that the speed of a turbine varies as the square root of the net head on the turbine. For instance, if the speed is 100 R. P. M. under a head of 16 meters, then the speed will be $\frac{100}{\sqrt{2}}$ or about 71 R. P. M., under a head of 8 meters, and the speed will be $\frac{100}{\sqrt{4}}$ or 50 R. P. M., when the head has dropped to ¼ of the maximum head.

If a turbine is directly connected to an alternating current generator, it is desirable that it should always operate at the same speed or frequency, for, otherwise, parallel operation with other generators would be impossible. Therefore, if a turbine were normally designed for a speed of 100 R. P. M. under a net head of 16 meters, it would have to develop under a head of 4 meters, not 50 R. P. M., but twice as much, that is, 100 R. P. M., in order to produce current of the proper frequency. A turbine operating at a speed which is 100 per cent higher than normal, however, shows such unfavorable hydraulic efficiencies that its use becomes an uncommercial proposition.

The power developed by a turbine is even more sensitively affected by a change in the net head: first, on account of the head itself, and second, on account of the discharge capacity. The capacity or power of the turbine, however, is also subjected to variation due to variation in the efficiency of the turbine, for the efficiency deviates from its best value as the speed is greater or less than normal.

The present invention may include the use of a generating unit driven by a hydraulic turbine wherein the latter is subjected to widely varying heads, along with electrically operative means for insuring that the current originally produced by the generator, may be supplied to the distribution line at a single, desired line frequency, to the final end that, independently of the head under which the turbine is operated, the frequency of the current supplied to the line circuit may remain constant at the desired value.

It is an object of this invention to provide a power installation of improved design wherein an alternating current dynamo-electric unit is connected to a hydraulic machine for operation therewith at a variable speed and is likewise connectible in efficient power transfer relation with a line circuit whose frequency is definitely established by means independent of said dynamo-electric unit.

It is a further object of this invention to provide a power installation of improved design and comprising an alternating current generator unit driven by a prime mover normally subjected to a widely variable supply of energy, along with means for converting the electrical energy of the generator unit under certain conditions so as to produce current of a constant and desired frequency in the line circuit.

It is a further object of this invention to provide a hydro-electric installation of improved design and comprising an alternating current generator connected to a hydraulic turbine which is subjected to and operative under widely varying head conditions, and a frequency converting device whereby variable frequency current of the generator may be converted to constant frequency current supplied to the line circuit.

These and other objects and advantages are secured by the present invention, various novel features of which will appear from the description and drawings herein, disclosing an embodiment of the invention, and will be more particularly pointed out in the claims.

The single figure of the drawing discloses a partially sectional elevation of a hydro-electric installation, with a diagrammatic showing of certain of the electrical elements and operative connections therebetween.

In accordance with the disclosure of the drawings, a hydraulic turbine 10 is suitably mounted in a setting, and means, such as a shaft 11 and associated parts, may be provided for controlling the guide vanes or other devices for varying the supply of water to the turbine inlet. As indicated, the turbine is located so that its inlet freely communicates with a forebay 12, and the discharge tube or draft tube of the turbine is operatively associated with a tail-race 13. A generator 14, of the alternating current type and preferably a synchronous machine, a source of D. C. field supply being indicated at $14_a$ with a controlling rheostat $14_b$ in the circuit, is suitably supported in position and its rotor is direct connected to the shaft of the hydraulic turbine, as indicated.

Electrical energy produced by the generator 14 finds its path through a circuit 15 and a switch 16, when the latter is in closed position, to the distribution line circuit 17. As indicated, a switch 18 is preferably disposed in the circuit 15. A rotary frequency converter 19 of any suitable type, here shown as comprising separate synchronous motor-generator elements 21 and 23, a source of D. C. field supply being indicated at 22, with controlling rheostats $21_a$ and $23_a$ in the field circuits of the machines 21 and 23, respectively, is arranged for connection to the generator 14 and the distribution line circuit 17. The numbers of field poles of the converter elements 21 and 23 are preferably in the ratio of 2 to 3, that is, if the element 21 has 4 poles, the element 23 should have 6 poles, or if the element 21 has 8 poles, the element 23 should have 12 poles. As indicated, the field element of the converter element 21 has 8 poles, whereas the field element of the converter element 23 has 12 poles. The effect of this arrangement is that when operated as synchronous motors, the two converting elements 21 and 23 have different synchronous speeds which are in inverse ratio to the number of poles of the field elements of these machines.

The synchronous element 21 is connectible to the circuit 15 of the generator through a circuit 24 and a switch 25, when this switch is moved toward the left to operative position, and this synchronous element is also connectible through a circuit 27 to the line circuit 17, when this switch 25 is moved to the right to operative position. The synchronous element 23 is connectible to the circuit 15 of the generator through a circuit 28 and a switch 29, when the latter is moved toward the right to its operative position, and the circuit 30. When the switch 29 is moved toward the left to its operative position, the synchronous element 23 is connected, through a circuit 31, to the line circuit 17.

The switch 16 is provided with an operating rod 34 having resilient means associated therewith, as indicated at 35, for biasing the switch to closed position; and the switches 25 and 29 are preferably connected by a common operating rod 36 to insure simultaneous operation of these switches in the same direction. This rod 31 is provided with a cam element 37 having a double cam surface cooperative with a head portion 38 on the operating rod 34 of the switch 16. The normal position of the switch 16 is closed, and, with the switches 25 and 29 in open position, the head portion 38 lies at the inner end of the recess in the cam element 37. On operation of the switches 25 and 29 in either direction to closed position, the switch 16 is moved to open position through the cooperative connection between the cam element 37 and head portion 38 of the operating rod 34 and against the effect of the biasing means 35. The arrangement of the switches and their operating devices is such that the switches 25 and 29 remain in either of the operative positions to which they are actuated; and, hence, in either of such operative positions, the switch 16 remains open.

The hydro-electric installation illustrated herein may be considered as being subjected to a head varying between a maximum head $H_1$ and a minimum head $H_2$. $H_a$ may be considered as the average head under which the turbine is operative. Under these circumstances, it may be preferable to select a design of turbine, which, when subjected to the average head $H_a$, will cause operation of the generator at a speed necessary to produce electrical energy of desired line frequency, say 60 cycles. Under conditions of normal design and operation of hydraulic turbines, fairly efficient operation of the turbine under conditions of constant speed and variable load may be maintained even though there is considerable variation in the head under which the turbine operates; and we can assume that the turbine may be controlled to maintain a constant speed, of say 180 R. P. M., and voltage, of say 4000 volts, under conditions of variable load, for a considerable variation in head both above and below the value $H_a$.

For the remainder of the range in head up to maximum head $H_1$, we can consider that $H_{1a}$ is an average value, and that a turbine speed of 270 R. P. M. can readily be maintained under conditions of variable turbine load and a head varying between maximum head $H_1$ and the upper limit of the range corresponding to operation of the turbine at a speed of 180 R. P. M.

We can assume further that the range in head between the lower limit in which the turbine is controlled, to maintain the constant speed of 180 R. P. M., and the minimum head $H_2$, has an average value of head of $H_{2a}$. For operation of the turbine under heads within this lower range whose average value is $H_{2a}$, the turbine is regulated to maintain a speed of 120 R. P. M. under conditions of variable load on the turbine. It is apparent that the total variation in head is divided into three ranges, the average head values being $H_a$ for the middle range, $H_{1a}$ for the upper range, and $H_{2a}$ for the lower range; and these average head values are such as to produce definite turbine speeds of 180 R. P. M., 270 R. P. M., and 120 R. P. M. The speed of the turbine may be maintained constant at any one of these values, dependent upon the head at the time, and under conditions of varying load, through the use of suitable governing apparatus, preferably of the type described in the inventor's co-pending application, Serial No. 498,720, filed Sept. 6, 1921.

Assume that the turbine is operating under a head within the intermediate range whose average value is $H_a$. Under these conditions of operation, the governor is adjusted to maintain a turbine speed of 180 R. P. M. With the turbine operating at this intermediate speed, the switches 25 and 29 are in their intermediate or open positions and the switches 16 and 18 are closed. Under these conditions, the generator 14 is connected directly to the distribution line circuit 17, and the electrical energy of the generator is delivered at 4000 volts and 60 cycles. While the variation in head is confined to the intermediate range, the speed of the turbine can readily be maintained by the governor at 180 R. P. M., and this in spite of variations in the load on the turbine.

Assume now that the head on the turbine has increased beyond the upper limit of the intermediate range. Under these conditions, the governor is adjusted to maintain a turbine speed of 270 R. P. M., under which conditions the generator produces electrical energy at a frequency of 90 cycles. However, in order that the electrical energy supplied to the line circuit 17 may still be 60 cycles, the operating rod 36 is shifted to the right so that the switch 29 connects the generator circuit 15, through the circuit 30 and circuit 28, to the 12-pole synchronous machine 23 which is now driven as a synchronous motor; and the switch 25 connects the 8-pole synchronous machine 21, acting as a generator, to the line circuit 17, through the circuit 24 and circuit 27. Operation of the rod 36 from the intermediate position shown has caused the switch 16 to be actuated to open position through the cooperation of its operating rod 34 and the cam element 37 on the rod 36. With the connections as described, the generator 14 delivers current of 90 cycles to the 12-pole synchronous machine 23, causing the latter to operate as a motor at a speed of 900 R. P. M. Consequently, the synchronous 8-pole machine 21, operating as a generator with the proper field excitation, produces electrical energy at 60 cycles and 4000 volts and supplies the same to the distribution line 17. The final result, in so far as the distribution line is concerned, is that 60 cycle current is still supplied to the line independently of the change in speed of the turbine and generator.

Assume now that the head under which the turbine is operating has decreased to a value within the lower range whose average head is $H_{1a}$. Under these conditions, the governor is adjusted so as to maintain a turbine speed of 120 R. P. M. With the turbine operating at this speed, the generator produces electrical energy at a frequency of 40 cycles. Under such conditions of operation, the operating rod 36 is shifted so as to move the switches 25 and 29 to their operative positions at the left, wherein switch 25 connects the 8-pole synchronous machine 21 with the generator circuit 15, and the switch 29 connects the synchronous 12-pole machine 23 with the line circuit 17. When the switches 25 and 29 are moved to their new operative positions, the switch 18 is moved to open position, through cooperation of the head 38 on its operating rod 34 and the cam element 37. With the connections as described herein, the generator 14 supplies electrical energy at 40 cycles to the 8-pole synchronous machine 21, causing the latter to operate as a motor at a synchronous speed 600 R. P. M. Consequently, the synchronous 12-pole machine 23, operating as a generator with the required degree of field excitation, supplies electrical energy at 60 cycles and 4000 volts; and the final result is that the line is still supplied with 60 cycle energy even though there has been a change in the operating speed of the turbine and generator.

With the same degree of field excitation on the generator 14 at the different operating speeds, and assuming a generator voltage of 4000 volts at the normal speed of 180 R. P. M., then the voltage for the speed of 270 R. P. M. would be 6000 volts, and the voltage for the speed of 120 R. P. M. would be 2770 volts. The excitation of the synchronous machines 21 and 23, when acting as generators, is adjusted in each case so that the voltage of the energy supplied by these machines to the line is 4000 volts. In order to render the voltage more nearly constant throughout the cycle of head variation, the excitation of the generator 14 may be increased, when the generator is operating at the lower speed, and decreased when the generator is operating at the higher speed, so as to render the generator voltages at these times equal to, or as nearly so as desired, the normal generator voltage, that is, the voltage corresponding to a speed of 180 R. P. M., this voltage being assumed as 4000 volts.

By using separate converter sets and separate prime mover units, the number of prime mover units and converter sets and their respective capacities can be so adjusted that each can be operated at a favorable load. For instance, when operating under low head where one prime mover develops 2000 H. P., four such prime movers could be utilized, running in parallel with one converter set, thus permitting its operation at high economy.

It will be apparent that either or both of the synchronous machines 21, 23 may be provided with means for varying the numbers of field poles to the end that additional definite turbine speeds, and consequently frequencies of the generator 14, may be utilized for producing the desired line frequency of 60 cycles.

While the simplest design of the system disclosed herein would probably include the shifting of the switch apparatus and the adjusting of the governor by hand as the head on the hydraulic machine varies from one operating range to another, nevertheless, it is contemplated that this operation of providing for a change in the operating speed of the hydraulic machine, while providing for the desired constant frequency of the line circuit, may be wholly automatic in response to variations of the head under or against which the hydraulic machine is operating, that is, beyond predetermined limits corresponding to the limits of the three ranges of head described above. An automatic device responsive to head, as described in applicant's co-pending application referred to above, may readily be utilized for both adjusting the speed setting of the governor and for making the desired changes in circuit connections between the generator and the synchronous machines and the line circuit. Likewise, this head responsive device may be utilized for causing the above mentioned changes in field excitation of the generator to be made as the speed of the generator is caused to change.

While the power unit described finds great utility when connected with a distribution circuit whose frequency is definitely established by means other than said power installation, nevertheless, it finds considerable utility when said power unit constitutes the only means supplying or definitely establishing the frequency of the distribution circuit, for through the means described for maintaining a plurality of definite operating speeds for the generator and the frequency transformer device specified, the unit is readily operative to furnish a supply of power to such distribution circuit at the desired definite operating frequency.

Again, this automatic control may be such as insures the automatic synchronizing of the dynamo-electric unit with respect to the line circuit, incident to any change from one to another of the definite operating speeds.

In applicant's copending application Ser. No. 498,720, filed Sept. 6, 1921, there is disclosed, as a specific embodiment, a system including a hydraulic turbine subject to a variable available head thereon and connected to drive an alternating current generating unit in the form of a double generator adapted to operate with different numbers of effective field poles, and speed-regulating means for the turbine operative to cause the latter to maintain a plurality of constant speeds each dependent upon the head on the turbine at the time, and these speeds being of such value that when the generating unit is operative with the several number of poles, it will produce alternating current of the same frequency. And features of invention common to the disclosure of the earlier filed application and the present application, and which are concerned with the production or utilization of current of constant frequency in the distribution circuit while the turbine is operating at different speeds, are claimed broadly in application Ser. No. 498,720.

It should be understood that the invention claimed is not limited to the exact details of construction and arrangement shown and described herein, for obvious modifications will occur to one skilled in the art.

It is claimed and desired to secure by Letters Patent:

1. A power installation for the production of alternating current of constant frequency under conditions of widely varying supply of energy and varying speed of prime mover consequent thereto, comprising an alternating current generator unit, a prime mover mechanically connected to said unit and operable to drive said unit at different speeds, a distribution circuit carrying current of a frequency definitely established by means other than said generator unit, and means for interchangeably increasing and decreasing the frequency of the energy supplied by said generator unit to the value of the frequency of said distribution circuit, said means being connectible in power relation between said generator unit and said distribution circuit.

2. A power installation for operation under conditions of widely varying supply of energy, comprising an alternating current generator unit, a prime mover operable to drive said unit at different speeds dependent upon the supply of energy available, a distribution circuit carrying current of a frequency definitely established independently of said generator unit, and a frequency converter connectible between said unit and said distribution circuit and comprising a motor-generator set reversibly operative to interchangeably increase and decrease the frequency of the current of said generator unit to that of said distribution circuit.

3. A power installation for operation under conditions of widely varying supply of energy, comprising an alternating current generator, a prime mover operable to drive said generator at different speeds dependent upon the supply of energy available, a distribution circuit the frequency of whose current is definitely established independently of said generator, a frequency converter comprising a plurality of reversibly operative and mechanically connected dynamo-electric machines, one of said machines being operable with a number of field poles different from that of the other machine, and means for reversibly connecting the units of said frequency converter between said generator and said distribution circuit to insure the operation of said converter to interchangeably increase and decrease the frequency of the electrical energy supplied by said dynamo-electric machine to the same value as the frequency of said distribution circuit.

4. A power installation for operation under conditions of widely varying supply of energy, comprising an alternating current generator, a prime mover connected in fixed driving relation to said generator and operable to drive said generator at different speeds dependent upon the supply of energy available, a constant frequency distribution circuit, a frequency converter comprising a synchronous motor-generator set, the units of said set being operable with different numbers of field poles, and circuit controlling devices operative to provide interchangeably a direct connection between said generator and said distribution circuit, connections between said generator and one of the units of said frequency converter and between the second unit of said frequency converter and said distribution circuit, and connections between said generator and said second unit and between said first unit and said distribution circuit.

5. A hydro-electric installation for the generation of alternating current of constant frequency under conditions of widely varying head and varying speed of prime mover consequent thereto, comprising an alternating current generator, a turbine operable to drive said generator at a plurality of different speeds, a distribution circuit, and variable ratio frequency-converting means for insuring the supply of electrical energy from said generator to said distribution circuit at a predetermined frequency independently of the particular one of said speeds at which said turbine drives said generator.

6. A hydro-electric installation for the generation of alternating current of constant frequency under conditions of widely varying head and varying speed of prime mover consequent thereto, comprising an alternating current generator, a turbine operable to drive said generator at different speeds, a distribution circuit, and means for converting the energy supplied by said generator to energy of the frequency of said distribution circuit independently of whether the frequency of the current of said generator is above or below that of said distribution circuit.

7. A hydro-electric installation for the generation of alternating current of constant frequency under conditions of widely varying head and varying speed of prime mover consequent thereto, comprising an alternating current generator, a turbine mechanically connected in fixed driving relation to said generator and operable to drive said generator at different speeds, a distribution circuit, and means for converting the energy produced by said generator to energy of the frequency of said distribution circuit independently of whether the frequency of the current of said generator is above or below that of said distribution circuit, said means comprising a motor-generator set one of the units of which is operable with a number of field poles different from that of another of said units.

8. A hydro-electric installation for operation under conditions of widely varying head, comprising an alternating current generator, a turbine operable to drive said generator at different speeds dependent upon the head under which said turbine is working, a constant frequency distribution circuit, a frequency converter including a motor-generator set the units of which are interchangeably operable as generator and motor, one of said units being operable with a number of field poles different from that of another unit, and means for reversibly connecting the units of said frequency converter between said dynamo-electric machine and said distribution circuit.

9. A hydro-electric installation for operation under conditions of widely varying head, comprising an alternating current generator, a turbine operable to drive said generator at different speeds dependent upon the head under which said turbine is working, a constant frequency distribution circuit, a frequency converter including a synchronous motor-generator set, each of the units of said set being interchangeably operable as generator and motor and one of said units being operable with a number of field poles different from that of the other unit, and circuit controlling devices operative to provide interchangeably and alternatively a direct connection between said generator and said distribution circuit, connections between said generator and one of the units of said motor-generator set and between the second unit thereof and said distribution circuit, and connections between said generator and said second unit and between said first unit and said distribution circuit.

10. A hydro-electric installation for operation under conditions of widely varying head and varying speed of hydraulic machine incident thereto, comprising a hydraulic machine operable at different normal speeds, a synchronous alternating current dynamo-electric unit operatively connected to said hydraulic machine for operation therewith, a distribution circuit whose frequency is definitely established and maintained independently of the speed of operation of said dynamo-electric unit, and means for connecting said dynamo-electric unit to said distribution circuit, said means including instrumentalities for interchangeably increasing and decreasing the frequency of the electrical energy transferred between said dynamo-electric machine and said distribution circuit.

11. A hydro-electric installation for operation under conditions of widely varying head, comprising a hydraulic machine operable at different normal speeds, an alternating current dynamo-electric machine operatively connected to said hydraulic machine for operation therewith, a distribution circuit whose frequency is definitely established independently of said hydro-electric installation, a frequency converter comprising a pair of mechanically connectible dynamo-electric machine units interchangeably operable as motor and generator, one of said units being operable with a number of field poles different from that of the other unit, and means for reversibly connecting said frequency converter between said dynamo-electric machine and said distribution circuit.

12. A hydro-electric installation for operation under conditions of widely varying head, comprising a hydraulic machine operable at different normal speeds dependent upon the head under which it is working, an alternating current dynamo-electric machine operatively connected to said hydraulic machine for operation therewith, a constant frequency distribution circuit, a frequency converter comprising a synchronous motor-generator set, the units of said set being operable with different numbers of field poles, and circuit controlling devices operative to provide interchangeably a direct connection between said dynamo-electric machine and said distribution circuit, connections between said dynamo-electric machine and one of the units of said frequency converter and between the second unit of said frequency converter and said distribution circuit, and connections between said dynamo-electric machine and said second unit and between said first unit and said distribution circuit.

13. A power installation for the generation of alternating current of constant frequency under conditions of widely varying supply of energy and varying speed of prime mover incident thereto, comprising an alternating current generator unit, a prime mover operable to drive said unit at different speeds dependent upon the supply of energy available, a distribution circuit carrying current whose frequency is established by means other than said generator unit, and means operative to insure the supply of electrical energy from said generator unit to said distribution circuit at the frequency of the latter independently of the particular one of said speeds at which said prime mover drives said generator unit, said means being mechanically independent of said generator unit.

14. A hydro-electric installation for the generation of alternating current of constant frequency under conditions of widely varying head and varying speed of prime mover consequent thereto, comprising a synchronous alternating current generator, a turbine operable to drive said generator at a plurality of different speeds and thereby cause said generator to produce current of different frequencies, a distribution circuit, and variable ratio frequency converting means for insuring the supply of electrical energy from said generator to said distribution circuit at a predetermined fixed frequency independently of the particular one of said frequencies at which said generator produces current, said means being mechanically independent of said turbine.

15. A hydro-electric installation for operation under conditions of widely varying head and varying speed of hydraulic machine incident thereto, comprising a hydraulic machine operable at definite normal speeds, a synchronous alternating current dynamo-electric unit operatively connectible to said hydraulic machine for operation therewith, a distribution circuit the frequency of whose current is definitely established at a predetermined value by means other than said dynamo-electric unit, and means for insuring the operation of said dynamo-electric unit at a plurality of synchronous speeds while connected in effective power relation with said distribution circuit, said means comprising a dynamo-electric machine mechanically independent of said hydraulic machine and said dynamo-electric unit.

In testimony whereof, the signature of the inventor is affixed hereto.

ARNOLD PFAU.